3,263,003
PHOSPHORUS CONTAINING POLYOLS
Lester Friedman, Beachwood Village, Ohio, assignor, by mesne assignments, to Union Carbide Corporation, a corporation of New York
No Drawing. Original application June 11, 1962, Ser. No. 201,240, now Patent No. 3,139,450, dated June 30, 1964. Divided and this application Aug. 7, 1963, Ser. No. 300,652
5 Claims. (Cl. 260—953)

This application is a division of application Serial No. 201,240, filed June 11, 1962, now Patent No. 3,139,450, and is a continuation-in-part of application Serial No. 129,529, filed August 7, 1961, now Patent No. 3,081,331, application Serial No. 145,749, filed October 17, 1961, now Patent No. 3,142,651, and application Serial No. 186,662, filed April 11, 1962, now Patent No. 3,092,651.

The present application relates to phosphites and phosphonates.

It is an object of the present invention to prepare novel hydroxyl containing phosphites.

Another object is to prepare novel hydroxyl containing phosphonates.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

The present invention relates to the secondary and tertiary phosphites of an alkaneetherpolyol having 3 to 6 hydroxyl groups and being the ether of an alkenepolyol having 3 to 6 hydroxyl groups with an alkylene glycol or polyalkylene glycol. The tertiary esters can be prepared by reacting 3 moles of the appropriate ether with 1 mole of a trihydrocarbon phosphite or trihaloaryl phosphite in the presence of 0.05–5%, preferably 0.1–1%, of a dihydrocarbon (such as aryl or alkyl) phosphite or dihaloaryl phosphite or an alkaline catalyst. More than 3 moles of the ether can be employed, e.g. 6 moles but the excess must either be recovered or left in the reaction product.

As the trihydrocarbon or trihaloaryl phosphite there can be used triphenyl phosphite, tri-o-cresyl phosphite, tri-p-cresyl phosphite, tri-m-cresyl phosphite, trixylenyl phosphite, tris decyl phosphite, diphenyl decyl phosphite, triethyl phosphite, tri-p-chlorophenyl phosphite, tri-o-chlorophenyl phosphite.

As the catalyst there can be used diphenyl phosphite, di-o-cresyl phosphite, di-p-cresyl phosphite, diethyl phosphite, didecyl phosphite, dioctadecyl phosphite and dl-p-chlorophenyl phosphite as well as alkaline materials preferably having a pH of at least 11 in a 0.1 N solution such as sodium phenolate, sodium methylate, sodium cresylate, potassium phenolate, sodium decylate and the sodium salt of tris (2-hydroxypropoxy) propane.

The hydroxyl containing phosphates can be prepared from the corresponding tris (alkaneetherpolyol) phosphite by oxidizing the phosphite with a stoichiometric amount of aqueous hydrogen peroxide or other peroxy compounds, e.g. peracetic acid and the hydroxyl containing thiophosphates can be prepared from the corresponding tris (alkaneetherpolyol) phosphite by adding the stoichiometric quantity of sulfur and heating to 110–130 C.

The tris (alkaneetherpolyol) phosphites are prepared by heating the appropriate alkaneetherpolyol, trihydrocarbon (or trihaloaryl) phosphite and catalyst in a vacuum and distilling out the phenol or alkanol formed. The reaction is conveniently carried out at 5–15 mm. at a pot temperature 120–150° C. although this is not critical.

In another aspect of the invention polymeric phosphites are prepared by utilizing less than 3 moles (and preferably between 2.5 and 2.17 moles) of the alkaneetherpolyol per mole of trihydrocarbon phosphite or trihaloaryl phosphite. If 2.5 moles of the alkaneetherpolyol is employed per mole of trihydrocarbon phosphite there is produced a dimer. With 2.33 moles of the polyol there is produced a trimer, with 2.75 moles of the polyol a tetramer and with 2.20 moles of the polyol a pentamer. As the polymer molecular weight increases there is an increased tendency for gelation during the trans-esterification and it is rare that it is possible to go beyond the hexamer stage. The same catalysts and conditions of heating are employed for making the polymers as are used in making the tris (alkaneetherpolyol) phosphite. The phosphite monomers and polymers described above have the Formula I

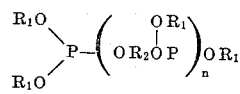

where $R_1O$ is the alkaneetherpolyol from which one hydrogen is missing, $OR_2O$ is the alkaneether polyol from which two hydrogens are missing and $n$ is an integer from 0 to 6, preferably not over 3.

A further aspect of the present invention is the bis (alkaneetherpolyol) phosphites and the polymers thereof having the Formula II

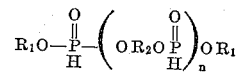

where $R_1O$, $OR_2O$ and $n$ are as defined above. Such compounds are prepared by transesterification of the appropriate alkaneether polyol with a dialkyl or diaryl phosphite such as diphenyl phosphite, di-p-cresyl phosphite, di-xylenyl phosphite, dimethyl phosphite, diethyl phosphite, dibutyl phosphite, didecyl phosphite and dioctadecyl phosphite by heating under vacuum, e.g. 5–15 mm., and removing the phenol or alkanol formed.

If 2 or more moles of the alkaneetherpolyol are employed per mole of dialkyl or diaryl phosphite there is formed a monomer, i.e. $n$ is 0. If between 1.5 and 1.14 moles of the polyol are employed per mole of dialkyl or diaryl phosphite polymers are formed. Thus if the ratio is 1.5:1 a dimer is formed ($n$ is 1), if the ratio is 1.33:1 a trimer is formed and if the ratio is 1.14:1 a hexamer is formed ($n$ is 5).

The bis (alkaneetherpolyol) hydrogen phosphites and the corresponding polymers set forth above can be reacted with epoxy compounds, vinyl compounds and allyl compounds to give polymers which are useful as fire or flame resistant coatings and films.

They can also be reacted with chloral to form phosphonates of the formula

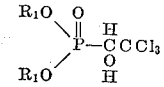

Another type of compound which comes within the present invention has the Formula III

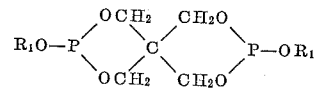

where $R_1$ is as defined above. These compounds are prepared by heating 2 moles of the alkaneetherpolyol, 1 mole pentaerythritol and 2 moles of a triaryl or trialkyl phosphite and removing the phenol or alkanol formed. Alternatively 2 moles of the alkaneetherpolyol can be reacted with 1 mole of a diaryl or dialkyl pentaerythritol diphosphite, e.g. diphenyl pentaerythritol diphosphite or didecyl pentaerythritol, diphosphite and removing the phenol or alkanol formed.

The phosphite compounds of Formulae I and III above are converted to phosphonates by heating with a catalytic amount e.g. 0.5–10% of an alkyl halide, e.g. butyl bromide, butyl chloride, amyl bromide or the like in an Arbuzov rearrangement.

As the alkaneetherpolyols there can be used reaction products of an alkanepolyol having 3 to 6 carbon atoms and 3 to 6 hydroxyl groups with one or more alkylene oxides such as propylene oxide, ethylene oxide and butylene oxide. As the alkanepolyol there can be used glycerine, 1,2,6-hexanetriol, trimethylolpropane, trimethylolethane, sorbitol, mannitol, arabitol and pentaerythritol.

The preferred alkylene oxide is propylene oxide.

Compounds such as tris-(2-hydroxypropoxy) propane, hexakis - (2 - hydroxypropoxy)-hexane and tetrakis-2-hydroxypropoxymethyl) methane which are employed as alkaneetherpolyols according to the invention can be prepared as described in Anderson Patent 2,927,918. Bis-(2-hydroxypropoxy) hydroxy propane can be formed in the same manner using only 2 moles of propylene oxide per mole of glycerine. A preferred compound for use according to the invention is 1,2,3-tris (2-hydroxypropoxy) propane because it has a high hydroxyl content and the resulting phosphites and phosphonates have very high hydroxyl contents (in general they have hydroxyl numbers above 300) and the phosphorus content is higher than with other materials. The 2-hydroxypropoxy group also has been found to give better products than the hydroxyethyl group.

In addition to the alkaneetherpolyols described in the Anderson patent there can be used the alkaneethertriols from 1,2,6-hexanetriol and propylene oxide having molecular weights of 750, 1500, 2400 and 4000 (available commercially as LHT 240, LHT 112, LHT 67 and LHT 42 respectively), triols from glycerine and propylene oxide having molecular weights of 1000 and 3000 (available commercially as LG 168 and LG 56 respectively), hexols from sorbitol and propylene oxide having molecular weights of 1000, 2500 and 300, triol from glycerine and ethylene oxide molecular weight 1000, triol from glycerine and a mixture of ethylene oxide and propylene oxide molecular weight 2000, triol from glycerine and butylene oxide molecular weight 1500, triol from trimethylol propane and propylene oxide molecular weights 300, 400, 700, 1500, 2500, 4000, 1700 and 2000 (Pluracol TP), hexol from mannitol and propylene oxide molecular weight 3000, triol from trimethylol ethane and propylene oxide molecular weight 2000, tetrols from pentaerythritol and propylene oxide molecular weights 400, 450, 500, 600, 750, 1000 and 2000 (some of which are available as Pluracols PeP).

The phosphites and phosphonates, as well as the phosphates and thiophosphates, of the present invention are particularly valuable for reaction with polyisocyanates, e.g. toluene diisocyanate, to form foamed polyurethanes or polyurethane elastomers which are flame resistant and have outstanding dyeing properties. The phosphites and phosphonates are useful as antistatic agents for polyethylene, polypropylene and nylon and as dye acceptors when incorporated into polyurethane, polyethylene, polypropylene or epoxy resin. The hydroxyl containing phosphites and phosphonates are valuable not only in the preparation of flame resistant polyurethane but can also be used to form flame resistant polyesters by reacting with polybasic acids, e.g. terephthalic acid, phthalic acid and adipic acid. Such polyesters can be employed as protective coatings for wood, metal or the like. The polyurethanes can be used as linings for textiles, e.g. coats, suits and dresses, insulation in building construction, carpet underlays, threads, cups and protective coatings for steel, wood and glass.

The phosphites and phosphonates of the present invention also are suitable as flame-proofing agents for cellulose and cellulose esters and as reactants in epoxy resin formulations.

In making polyurethanes the phosphites and phosphonates can be used as the sole polyhydroxyl containing reactant or they can be used with other polyhydroxy compounds, e.g. LG–56, polypropylene glycol 2025 molecular weight, sorbitol-propylene oxide adduct molecular weight 1000, polyethylene glycol molecular weight 2500 or polyethylene glycol-polypropylene glycol copolymer molecular weight 3000.

Examples of phosphites and phosphonates according to the invention are tris (tris (2-hydroxypropoxy) propane) phosphite and the isomeric phosphonate, pentakis (tris (2-hydroxypropoxy) propane) diphosphite and the isomeric diphosphonate, hepta (tris (2-hydroxypropoxy) propane) triphosphite and the isomeric triphosphonate, undeca (tris (2-hydroxypropoxy) propane) pentaphosphite and the isomeric pentaphosphonate, bis (tris (2-hydroxypropoxy) propane) pentaerythritol diphosphite and the isomeric diphosphonate, bis (tris (2-hydroxypropoxy) propane) hydrogen phosphite and the isomeric phosphonate tris (tris (2-hydroxypropoxy) propane) bis hydrogenphosphite, pentakis (tris (2-hydroxypropoxy) propane tetrahydrogenphosphite, bis (tris (2-hydroxypropoxy) propane $\alpha$-hydroxy-$\beta,\beta,\beta$-trichloroethanephosphonate, tris (hexakis (2-hydroxypropoxy)-hexane) phosphite and the isomeric phosphonate, tris (tetrakis (2-hydroxypropoxymethyl) methane) phosphite and the isomeric phosphonate, bis (tetrakis (2-hydroxypropoxymethyl) methane) pentaerythritol diphosphite and the isomeric diphosphonate, tris (bis (2 - hydroxypropoxy) - hydroxypropane) phosphite and the isomeric phosphonate, bis (bis (2-hydroxypropoxy)-hydroxypropane) pentaerythritol diphosphite and the isomeric diphosphonate, tris (propylene oxide-1,2,6-hexanetriol adduct) phosphite wherein the adduct has a molecular weight of 750 (tris LHT 240 phosphite) and the isomeric hexol phosphonate (made by the Arbuzov rearrangement, tris LHT 112 phosphite and the isomeric hexol phosphonate, tris LHT 67 phosphite and the isomeric hexol phosphonate, tris LHT 42 phosphite and the isomer hexol phosphonate, tris (polypropylene oxide-glycerine adduct) phosphite where the adduct has a molecular weight of 1000 (tris LG–168 phosphite) and the isomeric hexol phosphonate, tris LG–56 phosphite and the isomeric hexol phosphonate, tris (sorbitol-propylene oxide adduct molecular weight 1000) phosphite and the isomeric pentadecol phosphonate, tris (trimethylolpropane-propylene oxide adduct molecular weight 1700) phosphite and the isomeric hexol phosphonate, tris (ethylene oxide-glycerine adduct molecular weight 1000) phosphite and the isomeric hexol phosphonate, tris (trimethylolethane-propylene oxide adduct molecular weight 2000) phosphite and the isomeric hexol phosphonate, tris (mannitol-propylene oxide adduct molecular weight 3000) phosphite and the isomeric pentadecol phosphonate, tris (sorbitol-propylene oxide adduct molecular weight 3000) phosphite and the isomeric pentadecol phosphonate, tris (sorbitol-propylene oxide adduct molecular weight 2500) phosphite and the isomeric pentadecol phosphonate, tris (pentaerylthritol-propylene oxide adduct molecular weight 1000) phosphite and the isomeric nona-ol phosphonate, tris (pentaerythritol-propylene oxide adduct molecular weight 750) phosphite and the isomeric nona-ol phosphonate, tris (pentaerythritol-propylene oxide adduct) phosphites where the adducts have molecular weights of 400, 450, 500, 600, 700, 1500, 2500 and 4000 respectively and the corresponding isomeric nona-ol phosphonates. (The adduct phosphites can also be named as phosphites of the ether of propylene glycol, ethylene glycol, butylene glycol, polyethylene glycol, polypropylene glycol or polybutylene glycol and the polyhydric alcohol employed, e.g. tris (glycerine-polypropylene glycol 3000 ether) phosphite is synonymous with tris LG-56 phosphite.)

Further phosphites and phosphonates within the invention include tris (trimethylolpropane-propylene oxide adduct) phosphites where the adducts have molecular weights of 300, 400, 700, 1500, 2500 and 4000 respectively and the corresponding isomeric hexol phosphonates, LHT 240 nona-ol diphosphite and the isomeric nona-ol diphosphonates, LHT 240 dodeca-ol triphosphite and the isomeric dodeca-ol triphosphonate, the diphosphite of sorbitol-propylene oxide adduct having a molecular weight of 1000 and the isomeric diphosphonate containing 24 hydroxyl groups, the triphosphite of sorbitol-propylene oxide having a molecular weight of 1000 and the isomeric triphosphonate containing 33 hydroxyl groups, the diphosphite of pentaerythritol-propylene oxide adduct having a molecular weight of 500 and the isomeric tetradeca-ol diphosphonate as well as the corresponding diphosphites and diphosphonates from pentaerythritol-propylene oxide adducts of molecular weights 400, 450, 600 and 1000, the triphosphite of pentaerythritol-propylene oxide adduct having a molecular weight of 1000 and the isomeric nonadeca-ol triphosphonate as well as the corresponding triphosphites and triphosphonates from pentaerythritol-propylene oxide adducts of molecular weights 400, 500 and 600, the diphosphites of trimethylolpropane-propylene oxide adducts of molecular weights 300, 400, 700, 1500, 2500 and 4000 and the isomeric nona-ol diphosphonate as well as the corresponding triphosphites and dodeca-ol triphosphonate. In the above set forth group of compounds the polyol phosphites have the same number of hydroxyl groups as the isomeric phosphonates.

As examples of suitable thiophosphates and phosphates there can be mentioned tris LHT 42 thiophosphate, tris LHT 42 phosphate, tris LHT 67 phosphate, tris LHT 240 phosphate, tris LHT 67 thiophosphate, tris LHT 112 thiophosphate, tris LHT 240 thiophosphate, tris LG-56 thiophosphate, tris LG-168 thiophosphate, tris LG-56 phosphate, tris LG-168 phosphate, tris (pentaerythritol-propylene oxide 450) phosphate and the corresponding thiophosphate, tris (trimethylolpropane-propylene oxide molecular weight 700) phosphate and the corresponding thiophosphate, tris (tris (2-hydroxypropoxy) propane) phosphate and tris (tris (2-hydroxypropoxy) propane) thiophosphate.

At present the phosphates and thiophosphates do not appear to be as attractive as the phosphites and phosphonates.

As previously indicated the preferred compounds are the phosphorus derivatives of tris (2-hydroxypropoxy) propane.

As used in the instant specification and claims the term tris (2-hydroxypropoxy) propane is used for 1,2,3,-tris (2-hydroxypropoxy) propane.

Unless otherwise indicated all parts and percentages in the present specification and claims are by weight.

*Example 1*

Voranol CP 260 (made according to Patent 2,927,918 and being essentially 1,2,3-tris (2-hydroxypropoxy) propane and having 20.1% OH, an OH No. of 660 and a molecular weight of 255) in an amount of 765 grams (3 moles) was reacted with 310 grams (1 mole) of triphenyl phosphite in the presence of 2 grams of diphenyl phosphite catalyst at 120–135° C. The phenol formed was removed by distillation at 10–15 mm. The reaction was brought to completion by raising the pot temperature to 175–180° C. and utilizing a nitrogen stream to help remove the balance of the phenol. About 250 grams of phenol, melting point approximately 40° C. was collected (approximately 100% of theory). The almost colorless viscous fluid remaining in the pot was essentially pure tris (tris (2-hydroxypropoxy) propane) phosphite.

*Example 2*

200 grams of tris (tris (2-hydroxypropoxy) propane) phosphite were heated at 140–150° C. for five hours with 5 grams of butyl bromide to effect rearrangement to the corresponding tris (tris (2-hydroxypropoxy) propane) phosphonate which also was a liquid.

*Example 3*

765 grams (3 moles) of Voranol CP 260 and 366 grams (1.2 moles) of triphenyl phosphite in the presence of 2 grams of diphenyl phosphite catalyst were heated together in the manner described in Example 1. The resulting viscous colorless liquid after removal of the phenol by distillation was pentakis (tris (2-hydroxypropoxy) propane) diphosphite.

*Example 4*

200 parts of pentakis (tris (2-hydroxypropoxy) propane) diphosphite were heated at 140–150° C. with 7 parts of amyl bromide for five hours to effect rearrangement to pentakis (tris (2-hydroxypropoxy) propane) diphosphonate.

*Example 5*

510 grams (2 moles) of Voranol CP 260, 620 grams (2 moles) of triphenyl phosphite and 136 grams (1 mole) of pentaerythritol were reacted together in the presence of a small amount of diphenyl phosphite (2 grams, catalyst) at 125–130° C. at 10 mm. The phenol was removed by distillation at 10–15 mm. After the theoretical amount of phenol had been removed there was left in the pot bis (tris (2-hydroxypropoxy) propane) pentaerythritol diphosphite as a colorless, viscous non-inflammable liquid.

*Example 6*

200 parts of the product of Example 5 was heated with 5 parts of amyl chloride at 145–150° C. to form bis (tris (2-hydroxypropoxy) propane) pentaerythritol diphosphonate.

*Example 7*

510 grams (2 moles) of Voranol CP 260 and 195 grams (1 mole) of dibutyl phosphite were heated together under partial vacuum (about 15 mm.). Butanol distilled off as the reaction proceded. Towards the end of the reaction the pot temperature was increased to 130° C. and the pressure lowered to 1–2 mm. to remove the residual n-butanol. The colorless viscous residue was essentially pure bis (tris (2-hydroxypropoxy) propane) hydrogen phosphite.

*Example 8*

Bis (tris (2-hydroxypropoxy) propane) hydrogen phosphite in an amount of 278 grams (0.5 mole) was warmed to 50° C. to decrease its viscosity. With efficient stirring and cooling when necessary there was added 74 grams (0.5 mole) of freshly distilled chloral during 10 minutes. The reaction was mildly exothermic. Infrared analysis showed the disappearance of the P-H bonds and the formation of bis (tris (2-hydroxypropoxy) propane) α-hydroxy-β,β,β-trichloroethane phosphonate.

*Example 9*

The procedure of Example 1 was repeated replacing the Voranol CP 260 by 3 moles of bis (2-hydroxypropoxy) hydroxy propane to obtain tris (bis (2-hydroxypropoxy) hydroxy propane) phosphite as the product.

*Example 10*

LHT triol 240 (molecular weight 750) (2100 grams) 3 moles, triphenyl phosphite (310 grams) 1 mole and 5 grams of diphenyl phosphite (catalyst) were heated to 150° C. in vacuo. Phenol was stripped off. Nitrogen sparging was employed to remove the last trace of phenol. The distillate was 288 grams (slightly over 100% of theory) in 6 hours. The product was LHT 240 hexol phosphite and was filtered through Celite and recovered as a viscous light colored liquid.

Example 11

LG 168 triol (molecular weight 1000) (3000 grams) 3 moles, triphenyl phosphite 310 grams (1 mole) and 5 grams of diphenyl phosphite were heated in vacuo at 150° C. with nitrogen sparging. The phenol was removed in 6 hours by distillation. The yield of distillate was 290 grams (slightly in excess of theory). The LG 168 hexol phosphite was recovered as a viscous light colorless liquid after filtration through Celite.

Example 12

0.5 mole of 50% aqueous hydrogen peroxide were stirred into 0.5 mole of LHT 240 hexol phosphite. There was recovered LHT 240 hexol phosphate as a viscous liquid.

Example 13

The procedure of Example 12 was repeated replacing the LHT 240 hexol phosphite by 0.5 mole of LG-168 hexol phosphite. There was recovered LG-168 hexol phosphate as a viscous liquid.

Example 14

To 0.5 mole of LHT 340 hexol phosphite there was added the stoichiometric amount of sulfur (16 parts or 0.5 mole). The mixture was heated to 110–130° C. until reaction was complete. The viscous liquid product recovered was LHT 240 hexol thiophosphate.

Example 15

The procedure of Example 14 was repeated replacing the LHT 240 hexol phosphate by 0.5 mole of LG-168 hexol phosphite. The viscous liquid product recovered was LG-168 hexol thiophosphate.

Example 16

2.5 moles of LHT triol 240, 1 mole of triphenyl phosphite and 5 grams of diphenyl phosphite were heated to 150° C. in vacuo. Phenol was stripped off until about 3 moles of phenol were removed. The residue was LHT 240 nonoldiphosphite.

Example 17

3.5 moles of LHT triol 240, 1.5 moles of triphenyl phosphite and 5 grams of diphenyl phosphite were heated to 150° C. in vacuo. Phenol was stripped off until about 4.5 moles of phenol were removed. The residue was LHT 240 dodeca-ol triphosphite.

Example 18

3 moles of sorbitol-propylene oxide adduct having a molecular weight of 1000, 1 mole of triphenyl phosphite and 5 grams of diphenyl phosphite were heated to 150° C. in vacuo. 3 moles of phenol were stripped off. The product obtained was tris-(sorbitolpropylene oxide adduct) phosphite. The product had 15 free hydroxyl groups in the molecule.

Example 19

3 moles of pentaerythritol-propylene oxide adduct having a molecular weight of 1000, 1 mole of triphenyl phosphite and 5 grams of diphenyl phosphite were heated to 150° C. in vacuo. 3 moles of phenol were stripped off. The product was tris (pentaerythritol-propylene oxide adduct) phosphite. The product had 9 free hydroxyl groups in the molecule. In place of the adduct having a molecular weight of 1000 there can be used in this example the pentaerythritol-propylene oxide adducts having molecular weights of 750 or 2000 for reaction with the triphenyl phosphite.

The diphosphites and triphosphites of sorbitol-propylene oxide adducts and pentaerythritol-propylene oxide adducts can also be made by replacing the LHT triol 240 in Examples 16 and 17 by an equal molar amount of the sorbitol-propylene oxide adduct having a molecular weight of 1000 or the pentaerythritol-propylene oxide adduct having a molecular weight of 1000.

Example 20

Three moles of the tetra 2-hydroxypropoxy ether of pentaerythritol (pentaerythritol-propylene oxide adduct in a 1:4 mole ratio), one mole of triphenyl phosphite and 5 grams of diphenyl phosphite were heated to 150° C. in vacuo until about 3 moles of phenol were stripped off. The product obtained was the tris (pentaerythritol-propylene oxide adduct) phosphite.

Example 21

Tris LG-168 phosphite was heated with 5 mole percent of n-butyl bromide at 125–135° C. until no increase in P=O bond was observed in infrared analysis. Volatile material was stripped off at 150° C. and 10 mm. The liquid residue was essentially the hexol phosphonate of LG-168 isomeric with tris LG-168 phosphite and having a molecular weight of 3000.

Correspondingly a hexol phosphonate having a molecular weight of 2100 is obtained by isomerizing tris LHT 240 phosphite in Example 21. Likewise employing the procedure of Example 21 tris (pentaerythritol-propylene oxide adduct with a molecular weight of 450) phosphite can be isomerized to the corresponding nona-ol phosphonate molecular weight about 1230.

Example 22

900 grams (3 moles) of Pluracol TP-340 triol (a polyether triol prepared from trimethylolpropane and propylene oxide), 310 grams (1 mole) of triphenyl phosphite and 2 grams of diphenyl phosphite were reacted together at 130–140° C. under reduced pressure. Phenol was distilled off at 85–90° C. at 10 to 12 mm. Toward the end of the reaction the temperature was raised to 175° C. and nitrogen was passed through the mixture to help complete the removal of phenol. A total of 280 grams of phenol was collected (100% yield). The residue was essentially pure tris (Pluracol TP-340) phosphite, a hexol phosphite. This was rearranged to the corresponding phosphonate by heating with about 5 mole percent of butyl bromide for 7 hours at 135° C.

Example 23

3 moles of Pluracol TP-440 triol (a polyether triol prepared from trimethylolpropane and propylene oxide, molecular weight about 440) was used in place of the Pluracol TP-340 triol in Example 22 to form tris (Pluracol TP-440) phosphite and the corresponding phosphonate.

By varying the amount of Pluracol TP triol with respect to the triphenyl phosphite, it is possible to form hexol monophosphites and polymeric phosphites as pointed out above. Thus, from 3 moles of Pluracol TP-340 triol and 1 mole of triphenyl phosphite utilizing the reaction conditions of Example 22, there was obtained a hexol monophosphite and the corresponding monophosphonate. When 9 moles of Pluracol TP-340 triol and 4 moles of triphenyl phosphite are used in Example 22 pentadeca-ol tetraphosphite is first obtained which, in the next step, is rearranged to the corresponding phosphonate.

Mixed polyol phosphites and phosphonates can be prepared by initially transesterifying mixtures of polyols with triphenyl phosphite.

Example 24

Pluracol PeP 450 tetrol (a polyoxypropylene adduct of pentaerythritol, molecular weight about 450) in an amount of 3 moles was converted to tris (Pluracol PeP 450 tetrol) phosphite by reacting with 1 mole of triphenyl phosphite in the presence of 5 grams of diphenyl phosphite and heating to 150° C. in vacuo. 3 moles of phenol were stripped off. The tris (pentaerythritol-propylene oxide adduct) phosphite thus formed was rearranged to the corresponding phosphonate by treatment with 5 mole percent of butyl bromide at 135° C. for 8 hours.

By utilizing Pluracol PeP 550 tetrol (a polyoxypropylene adduct of pentaerythritol, molecular weight about 550) in place of Pluracol PeP 450 in Example 24 there is obtained first tris (Pluracol PeP 550 tetrol) phosphite and then the corresponding phosphonate.

By varying the mole ratios of tetrol to triphenyl phosphite, e.g., using 7 moles of the tetrol to 3 moles of the triphenyl phosphite, more highly condensed phosphites and phosphonates can be prepared.

*Example 25*

Hyprin GP 25 is essentially a mixture of tris 1,2,3-hydroxypropoxypropane and bis (hydroxypropoxy) hydroxypropane. The hydroxyl groups are essentialy all secondary. 3 moles of Hyprin GP 25 was transesterified with 1 mole of triphenyl phosphite in the presence of 5 grams of diphenyl phosphite in the manner described in Example 22 to give tris (Hyprin GP 25) phosphite, a hexol. This compound was rearranged with 5 mole percent of butyl bromide as a catalyst to give the corresponding phosphonate.

High phosphite condensation polymers can be obtained by varying the proportions of Hyprin GP 25 to triphenyl phosphite.

What is claimed is:
1. A phosphonate ester of a lower alkaneetherpolyol having the formula

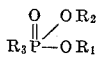

wherein $R_1$ and $R_2$ are an alkaneetherpolyol having 3 to 6 hydroxyl groups with one of the hydroxyl hydrogens removed, said alkaneetherpolyol being the ether of a lower alkanepolyol, having 3 to 6 carbon atoms and 3 to 6 hydroxyl groups, there being no more than one hydroxyl group attached to any carbon atom, with a member of the group consisting of lower alkylene glycols and poly lower alkylene glycols, said phosphonate having a plurality of free alcoholic hydroxyl groups and $R_3$ is as defined for $R_1$ except that a hydroxyl group is removed from the alkaneetherpolyol rather than a hydrogen.

2. A phosphonate according to claim 1 wherein said member of the group is a poly lower alkylene glycol, said phosphonate having at least 6 free hydroxyl groups.

3. A phosphonate according to claim 2 wherein the poly lower alkylene glycol is polypropylene glycol.

4. Tris (tris (2-hydroxypropoxy) propane) phosphonate.

5. A phosphonate ester according to claim 1 wherein the alkaneetherpolyol is a sorbitol polypropylene glycol ether.

No references cited.

CHARLES B. PARKER, *Primary Examiner.*

FRANK M. SIKORA, *Assistant Examiner.*